US012170557B2

(12) United States Patent
Raghavan et al.

(10) Patent No.: US 12,170,557 B2
(45) Date of Patent: Dec. 17, 2024

(54) BEAMFORMING CIRCUIT USING CONFIGURABLE PHASE SHIFTERS FOR A BUTLER MATRIX ARCHITECTURE

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 411 days.

(21) Appl. No.: 17/644,259

(22) Filed: Dec. 14, 2021

(65) Prior Publication Data

US 2023/0188187 A1    Jun. 15, 2023

(51) Int. Cl.
*H04B 7/06* (2006.01)
*H04W 16/28* (2009.01)

(52) U.S. Cl.
CPC .......... *H04B 7/0617* (2013.01); *H04B 7/063* (2013.01); *H04W 16/28* (2013.01)

(58) Field of Classification Search
CPC ...... H04B 7/0617; H04B 7/063; H04W 16/28
See application file for complete search history.

(56) References Cited

U.S. PATENT DOCUMENTS

| 10,530,448 | B1 * | 1/2020 | Tran ..................... H04B 7/0617 |
| 2011/0026418 | A1 * | 2/2011 | Bollea .................. H01Q 1/2258 370/252 |
| 2017/0033458 | A1 * | 2/2017 | Haziza ..................... H01Q 1/28 |
| 2020/0127765 | A1 * | 4/2020 | Sasaki ................... H04L 27/233 |

FOREIGN PATENT DOCUMENTS

WO    WO-2022110699 A1 *    6/2022    ............. G06F 17/16

* cited by examiner

*Primary Examiner* — Syed Haider
(74) *Attorney, Agent, or Firm* — Harrity & Harrity, LLP

(57) ABSTRACT

Certain aspects of the present disclosure provide techniques for communicating information associated with one or more phase shift parameters for a beamforming circuit, wherein the beamforming circuit includes a Butler matrix having one or more sets of configurable phase shifters; and communicating in accordance with the one or more phase shift parameters. Numerous other aspects are provided.

34 Claims, 9 Drawing Sheets

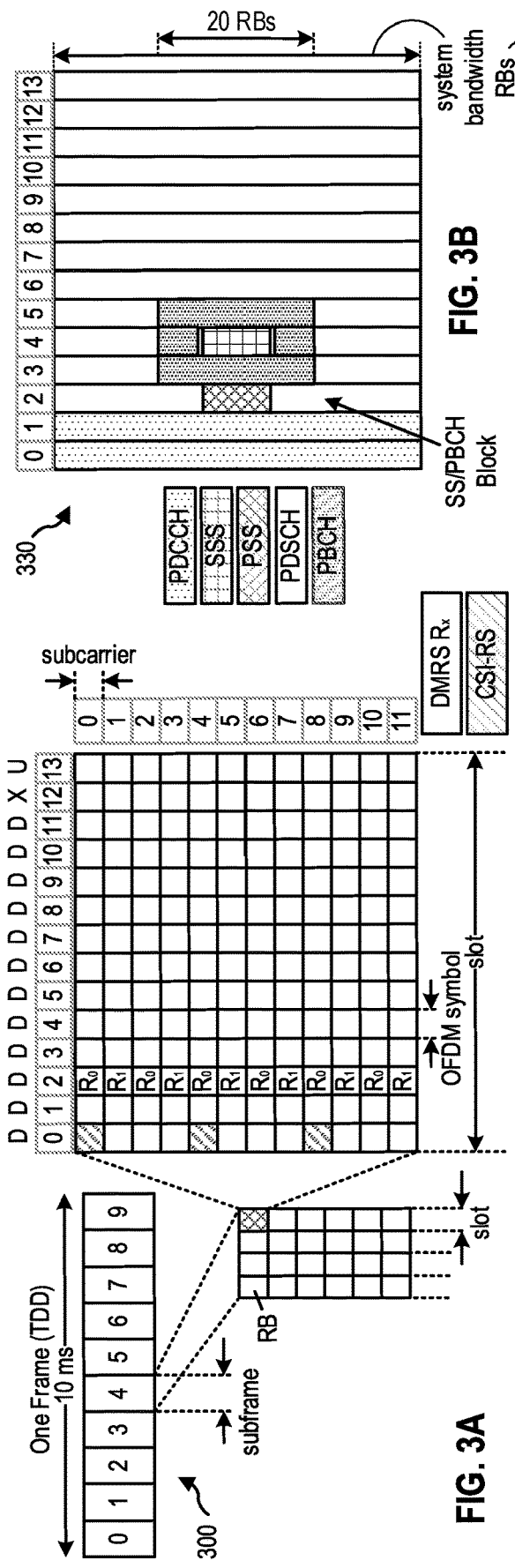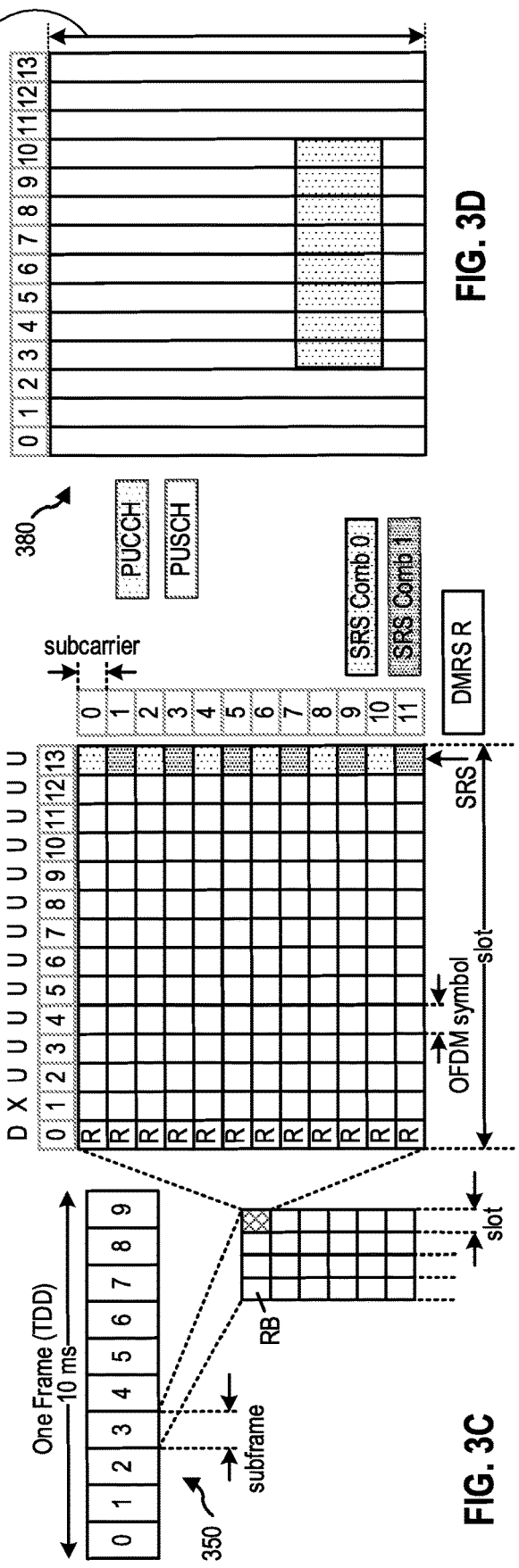

BEAMFORMING CIRCUIT USING CONFIGURABLE PHASE SHIFTERS FOR A BUTLER MATRIX ARCHITECTURE

INTRODUCTION

Aspects of the present disclosure relate to wireless communications, and more particularly, to techniques for beamforming using configurable phase shifters for a Butler matrix architecture.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless networks to overcome various challenges.

SUMMARY

One aspect provides communicating information associated with one or more phase shift parameters for a beamforming circuit, wherein the beamforming circuit includes a Butler matrix having one or more sets of configurable phase shifters; and communicating in accordance with the one or more phase shift parameters.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless network.

DETAILED DESCRIPTION

Aspects of the present disclosure provide apparatuses, methods, processing systems, and computer-readable mediums for beamforming using configurable phase shifters for a Butler matrix architecture.

There are various analog circuit architectures for performing beamforming. One example of a beamforming architecture is a Butler matrix architecture. A Butler matrix architecture uses hybrid couplers and a set of fixed-value phase shifters to generate a set of static, steerable beams. Another example of a beamforming architecture is a vector sum modulator architecture. A vector sum modulator architecture may provide a configurable set of phase shifts and/or amplitudes, which allows the generation of a dynamically reconfigurable set of steerable beams. A Butler matrix architecture may be associated with lower power consumption, simpler implementation, and less chip area than a vector sum modulator architecture especially as the carrier/operational frequency increases. However, a vector sum modulator architecture may provide increased flexibility to address changing conditions at the wireless communication device. These tradeoffs can lead to suboptimal performance, increased cost, and increased power consumption and associated thermal overheads.

Techniques and apparatuses described herein provide a beamforming circuit using a beamforming architecture that incorporates one or more configurable phase shifters into a Butler matrix architecture. For example, one or more of the fixed-value phase shifters of a Butler matrix architecture may be replaced with one or more configurable phase shifters. Techniques and apparatuses described herein also provide signaling such that phase shift parameters (or information associated with the phase shift parameters) can be communicated between network nodes, such as to facilitate communication by the network nodes, sensing operations, power control, rate control, or the like.

By providing configurable phase shifters in a modified Butler matrix architecture, chip size, power consumption, and latency are reduced relative to a vector sum modulator architecture. Furthermore, the modified Butler matrix architecture provides increased flexibility for beamforming relative to a traditional Butler matrix architecture (which incorporates only fixed-value phase shifters), which may improve beamforming gain and link reliability. Still further, the signaling of phase shift parameters enables improved power control (thereby providing lower power consumption), rate control (thereby providing increased link reliability and throughput), and more accurate sensing operations.

Introduction to Wireless Networks

Figure 1:
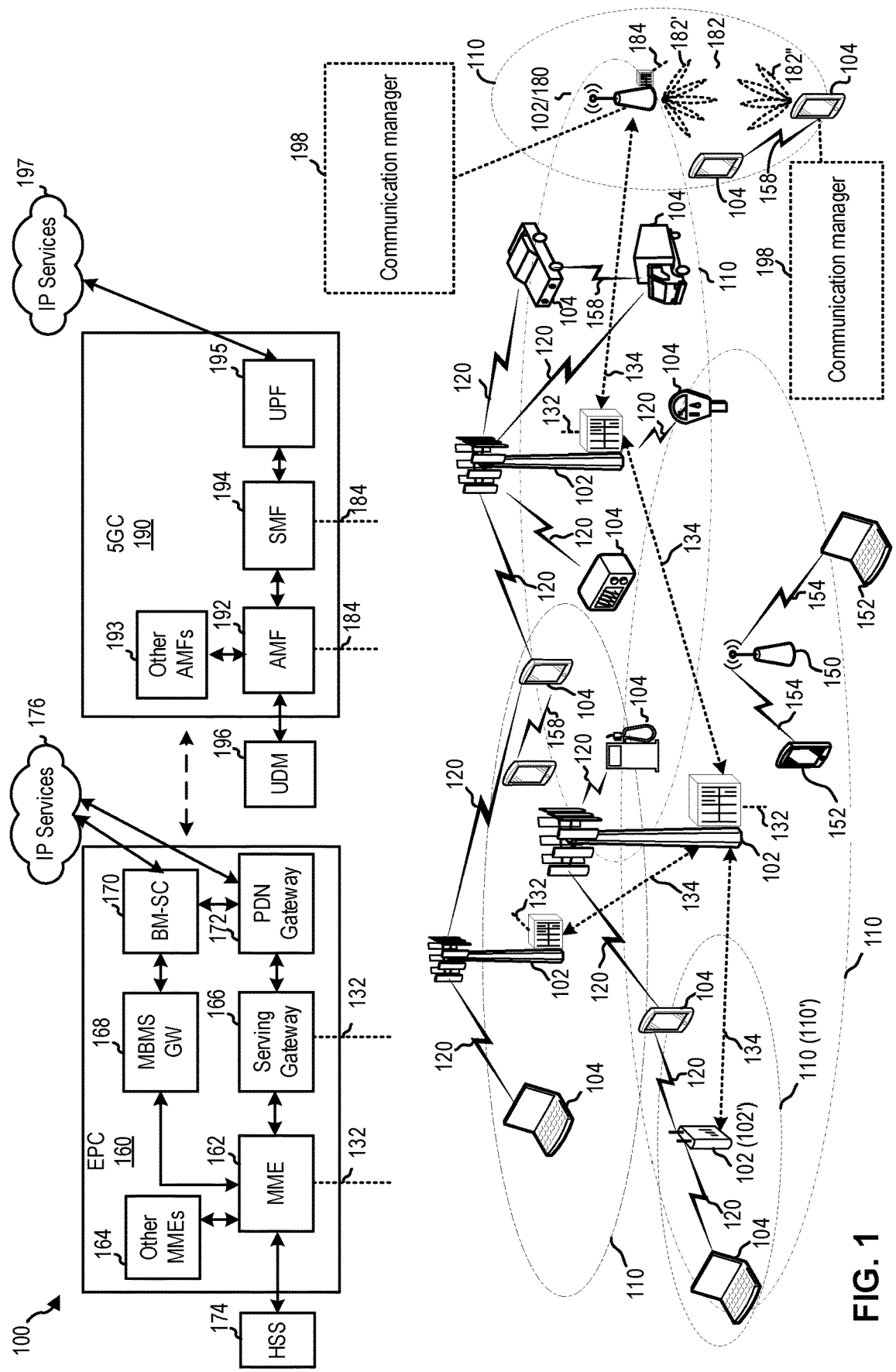
FIG. 1 is a block diagram illustrating an example wireless network.

FIG. 1 depicts an example of a wireless network 100, in which aspects described herein may be implemented.

Generally, wireless network 100 includes base stations (BSs) 102, user equipments (UEs) 104, one or more core networks, such as an Evolved Packet Core (EPC) 160 and 5G Core (5GC) network 190, which interoperate to provide wireless communications services. Some aspects of the present disclosure are described with regard to a network node. A network node can be any form of wireless communication device, such as a BS 102 or a UE 104.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point, in various contexts.

Base stations 102 wirelessly communicate with UEs 104 via communication links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a UE 104 to a base station 102, and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicle, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antennas, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless network 100 includes communication manager 198, which may be configured to communicate information associated with phase shift parameters of a beamforming circuit. Communication manager 198 may be implemented in one or more network nodes, such as a BS 102 or a UE 104.

Figure 2:
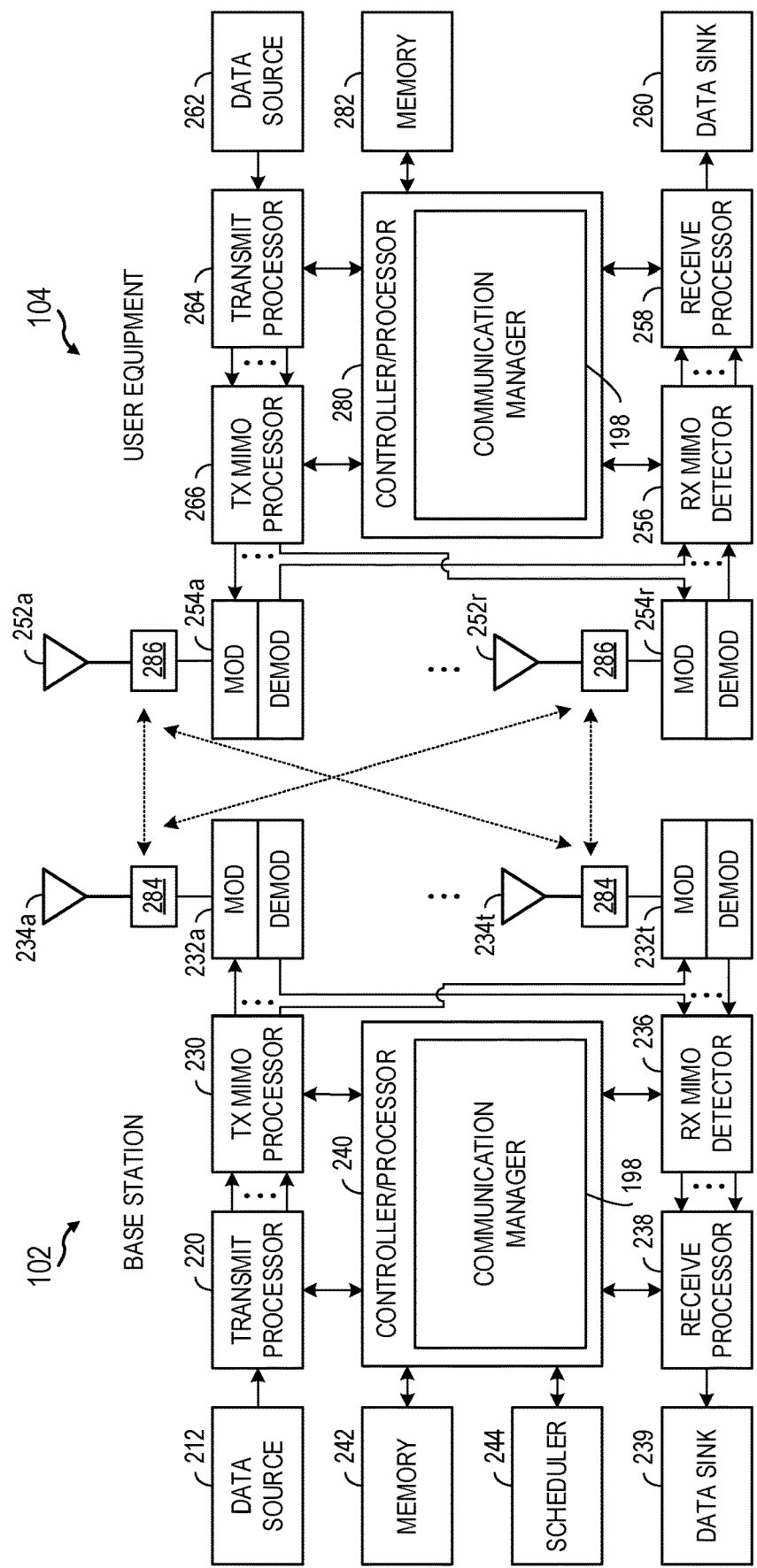
FIG. 2 is a block diagram illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes communication manager 198. Notably, while depicted as an aspect of controller/processor 240, communication manager 198 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes communication manager 198 of FIG. 1. Notably, while depicted as an aspect of controller/processor 280, communication manager 198 may be implemented additionally or alternatively in various other aspects of user equipment 104 in other implementations.

FIGS. 3A-3D depict aspects of data structures for a wireless network, such as wireless network 100 of FIG. 1. In particular, FIG. 3A is a diagram 300 illustrating an example of a first subframe within a 5G (e.g., 5G New Radio (NR)) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided elsewhere in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical specification (TS) 38.101 currently defines Frequency Range 1 (FR1) as including 600 MHz-7.125 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 24.25-52.6 GHz, though again specific uplink and downlink allocations may fall outside of this general range. FR2 is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency bands (e.g., 30 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Figure 4:
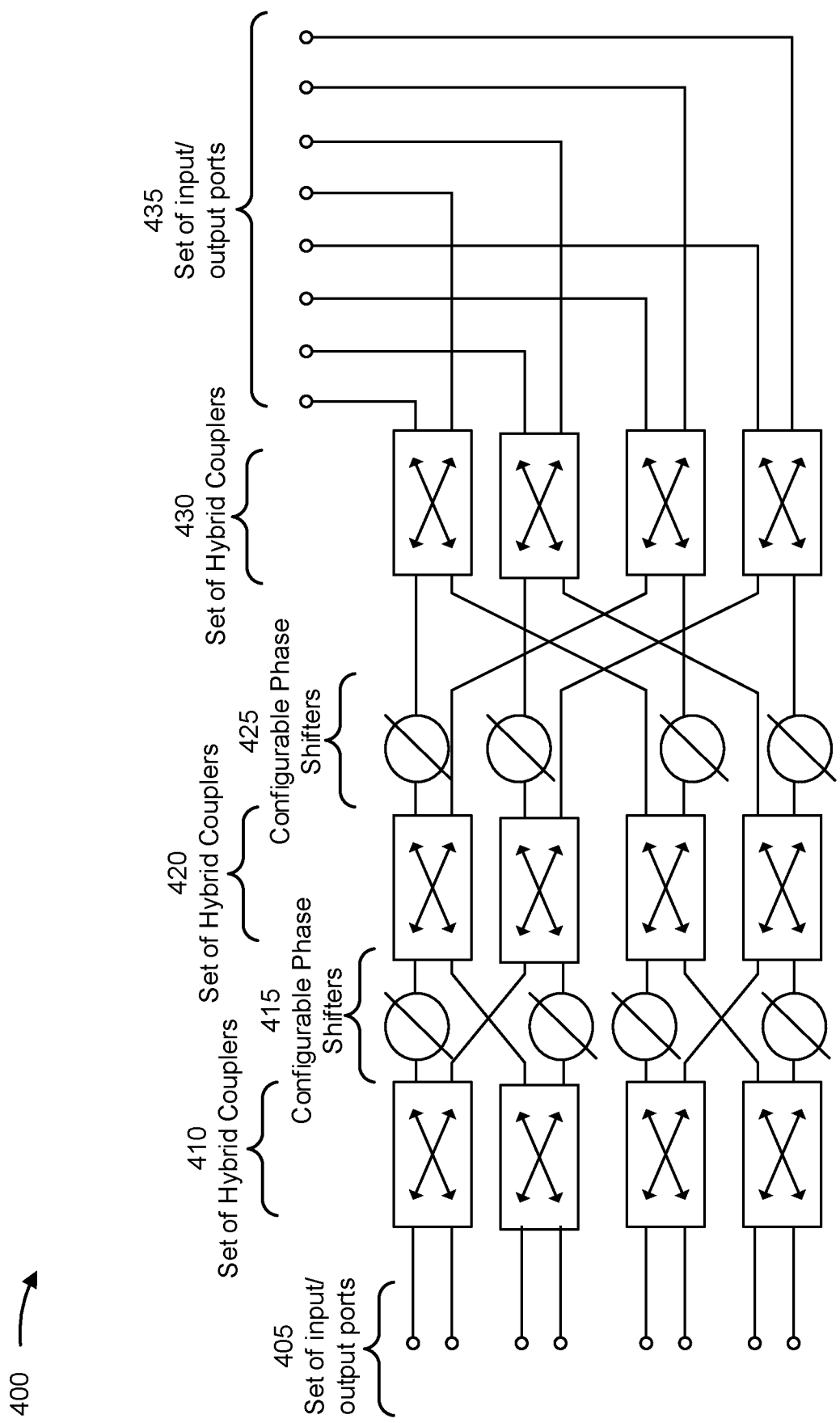
FIG. 4 is a diagram illustrating an example of a beamforming circuit, in accordance with the present disclosure.

As described herein, communications using mmWave/near mmWave radio frequency bands may be performed using a beamforming circuit (such as beamforming circuit 284 and/or beamforming circuit 286, depicted in FIG. 2 and in more detail as an example beamforming circuit 400 in FIG. 4). The beamforming circuit described herein may include one or more configurable phase shifters as part of a Butler matrix architecture, which provides increased flexibility relative to a traditional/baseline Butler matrix architecture (which generally does not include configurable phase shifters) while providing lower cost, simpler design, and less power consumption than other beamforming architectures such as vector sum modulator architectures.

Aspects Related to Beamforming using a Modified Butler Matrix Architecture

FIG. 4 is a diagram illustrating an example of a beamforming circuit 400. Some beamforming circuits may use a Butler matrix architecture. A Butler matrix architecture may conserve space on a semiconductor chip as well as power during beamforming operations of a communication device (e.g., a UE or a base station). For example, a communication device may use a Butler matrix architecture to communicate via a set of beams (e.g., a static set of beams) over millimeter wave bands and/or sub-terahertz frequencies. A traditional Butler matrix architecture may use one or more sets of fixed-value phase shifters (that is, non-configurable phase shifters), which reduces chip area usage at the cost of adaptability and flexibility of beamforming. For example, the fixed-value phase shifters may include phase shifters that shift phases by −67.5 degrees, by −22.5 degrees, and by −45 degrees.

The beamforming circuit 400 may use a modified Butler matrix architecture, in which one or more sets of configurable phase shifters 415 and 425 are used in place of fixed-value phase shifters. The beamforming circuit 400 includes a set of input/output ports 405 that can receive signals on which the beamforming circuit 400 operates and/or provide signals to another component (e.g., an antenna or a radio frequency front end component, among other examples) after the beamforming circuit 400 operates on the signals. In a three stage Butler matrix architecture with 8 input/output ports (referred to as a size-8 Butler matrix), ports 405 are connected to a set of hybrid couplers 410. The set of hybrid couplers 410 are connected to a set of configurable phase shifters 415. The set of configurable phase shifters 415 are connected to a set of hybrid couplers 420. The set of hybrid couplers 420 are connected to a set of configurable phase shifters 425. The set of configurable phase shifters 425 are connected to a set of hybrid couplers 430. The set of hybrid couplers 430 may be connected to a set of input/output ports 435. The sets of hybrid couplers 410, 420, 430 may provide connections that change an order of signals within the Butler matrix, such that an order (e.g., from top to bottom) at the set of input/output ports 405 is different from an order (e.g., from left to right) at the set of input/output ports 435. Each input/output port 435 may be connected to a different antenna of a set of antennas (e.g., an antenna panel or a tile). The sets of configurable phase shifters 415, 425 may apply phase shifts to signals within the Butler matrix according to a configuration of the configurable phase shifters 415, 425. The beamforming circuit 400 can include more sets of hybrid couplers or fewer sets of hybrid couplers than those depicted in FIG. 4. Furthermore, the beamforming circuit can include more sets of configurable phase shifters or fewer sets of configurable phase shifters than those depicted in FIG. 4. Lines between elements 405, 410, 415, 420, 425, 430, and 430 denote connections between those elements.

In some aspects, the sets of individually configurable phase shifters 415, 425 may be L-bit phase shifters, where L is an integer greater than zero. However, it should be noted that the sets of configurable phase shifters 415, 425 may include one or more fixed-value phase shifters (e.g., a combination of one or more configurable phase shifters and one or more fixed-value phase shifters). As noted, the configurable phase shifters 415, 425 may be individually configurable (e.g., each of the configurable phase shifters 415, 425 may be adjustable to different phase shifts). In some aspects, the configurable phase shifters 415, 425 may include one or more groups of configurable phase shifters, where a group of configurable phase shifters can collectively be set to a given phase shift. For an L-bit phase shifter, if L=0, then the beamforming circuit 400 may use a traditional Butler matrix architecture. L=1 can be considered a binary quantization (which may not necessarily be uniform), allowing a phase shifter optimization at a coarse level for narrow support regions, and for broad support regions. The usage of a non-zero value of L may provide increased flexibility in beamforming, with lower cost and less power usage than other beamforming circuit architectures, such as the vector sum modulator architectures. For example, L may be selected to balance flexibility in beamforming and power/cost savings. By selecting a particular value of L, the set of beams that can be generated by the beamforming circuit 400 can be dynamically or statically selected, such as to maximize array gain in different regions.

In this way, the beamforming circuit 400 may use configurable phase shifters to form a set of beams through which a communication device may communicate. The beamforming circuit 400 has a first number of input ports (e.g., 2, 4, 8, etc.) where a signal is applied (e.g., received) and a second number of output ports (e.g., 2, 4, 8, etc.). The input ports may be coupled to antennas, or the output ports may be coupled to the antennas. The beamforming circuit 400 may be configured to operate in both directions (e.g., a set of ports functions as input ports in a receive direction and as output ports in a transmit direction).

The Butler matrix may include $(N/2)*\log_2(N)$ hybrid couplers and $(N/2)*(\log_2(N)-1)$ configurable phase shifters, where N is a number of input ports. As shown in FIG. 4, the Butler matrix may be configured with 8 input ports, such that N=8, the Butler matrix includes 12 hybrid couplers, and the Butler matrix includes 8 configurable phase shifters.

The beamforming circuit 400 supports communication over a number of beams that may be equal to a number of input/output ports of the beamforming circuit 400. The beams may be configurable using the phase shifters and simultaneously steerable. Thus, increased flexibility regarding beam configuration is provided relative to a Butler matrix architecture using fixed-value phase shifters, while cost, complexity, and power consumption are reduced relative to a vector sum modulator architecture.

In some aspects, a first configurable phase shifter 415, of a first set of configurable phase shifters 415, is connected to a first hybrid coupler 410 of a first set of hybrid couplers 410 of the one or more sets of hybrid couplers 410, 420, 430 and a second hybrid coupler 420 of a second set of hybrid couplers 420 of the one or more sets of hybrid couplers 410, 420, 430. A second configurable phase shifter 425, of a second set of configurable phase shifters 425, may be connected to a third hybrid coupler 420 of the second set of hybrid couplers 420 and a fourth hybrid coupler 430 of a third set of hybrid couplers 430 selected from the one or more sets of hybrid couplers 410, 420, 430.

As indicated above, FIG. 4 is provided as an example. Other examples may differ from what is described with regard to FIG. 4.

Figure 5:
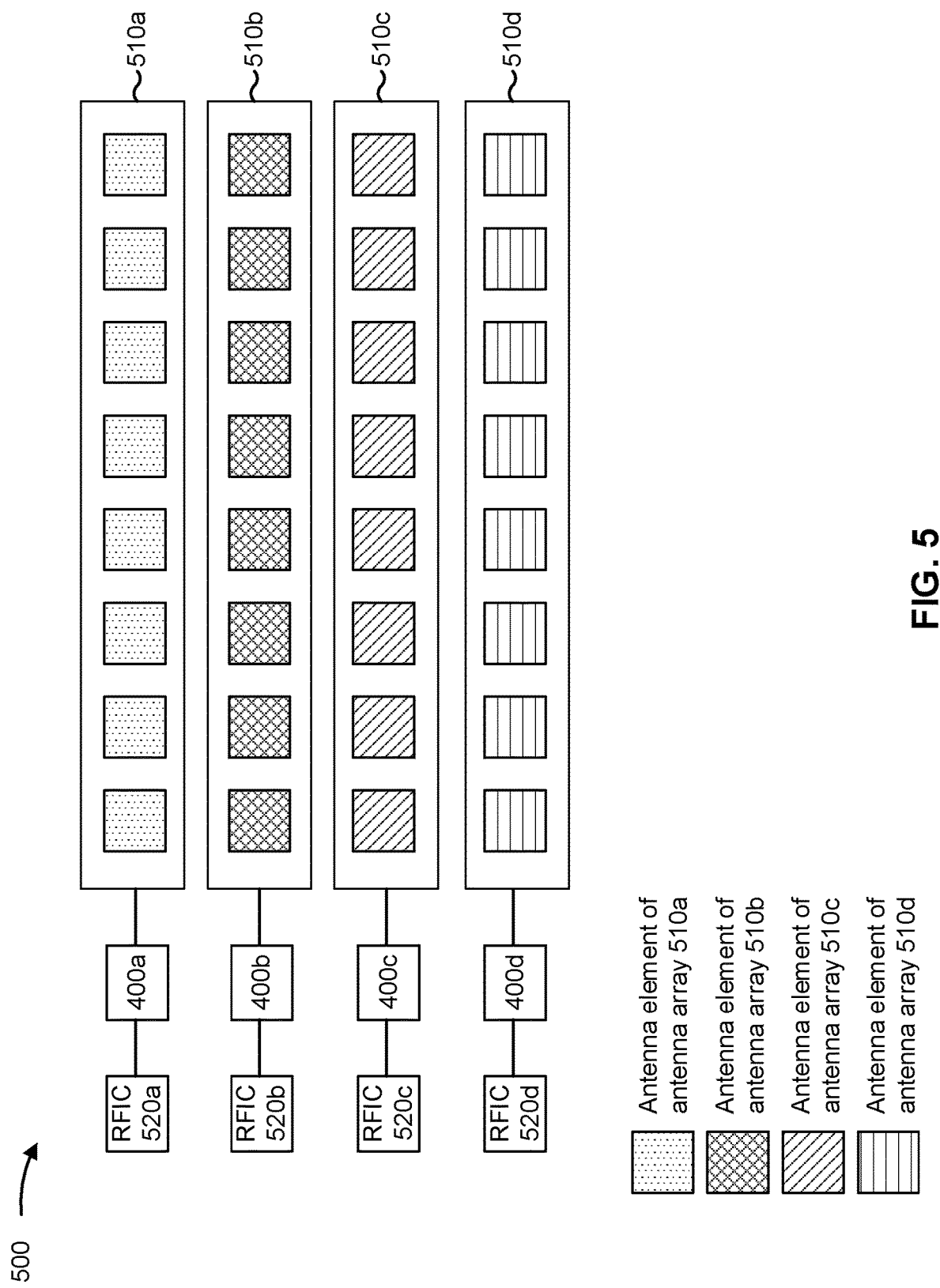
FIG. 5 is a diagram illustrating an example of multiple antenna arrays utilizing multiple beamforming circuits, in accordance with the present disclosure.

FIG. 5 is a diagram illustrating an example 500 of multiple antenna arrays utilizing multiple beamforming circuits 400, in accordance with the present disclosure. Example 500 includes antenna arrays 510a, 510b, 510c, and 510d. An antenna array may be referred to herein as a tile. Each antenna array 510 includes one or more antennas. In example 500, each antenna array 510 includes eight antennas.

As further shown, each antenna array 510 is associated with a respective beamforming circuit 400. For example, antenna array 510a is associated with beamforming circuit 400a, antenna array 510b is associated with beamforming circuit 400b, antenna array 510c is associated with beamforming circuit 400c, and antenna array 510d is associated with beamforming circuit 400d. Thus, each antenna array 510 may be capable of beamforming using a modified Butler matrix architecture that includes one or more configurable phase shifters.

As further shown, each antenna array 510 is associated with a respective radio frequency (RF) integrated circuit (RFIC) 520a through 520d. For example, an antenna array 510 may be coupled to an RFIC 520 (e.g., via a beamforming circuit 400). An RFIC 520 may include one or more components (e.g., one or more components described in connection with FIG. 2 and/or one or more other components) used for RF communication. For example, an RFIC 520 may include a baseband filter, a mixer, a variable gain amplifier (VGA), a power amplifier, a low noise amplifier, a combination thereof, or the like. In some aspects, a receive path of a network node (e.g., a UE or a base station) may be associated with a different RFIC than a transmit path of the network node. In some other aspects, the same RFIC may handle the receive path of the network node and the transmit path of the network node. In some aspects, a single RFIC may be associated with multiple antenna arrays. In some aspects, a single antenna array may be associated with multiple RFICs.

The usage of beamforming circuit 400 in conjunction with a single antenna array 510 may provide improved coverage and beamforming gain relative to a Butler matrix utilizing fixed-value phase shifters. For example, beamforming circuit 400 may be capable of generating beams within a range of $[-\varphi, \varphi]$ (units of degrees), which may be referred to as a coverage area or a scan area. For the purpose of describing improved coverage and beamforming gain, $\varphi$ is considered in the range of $[10°, 60°]$. Significant gain (such as >0.5 dB) in a worst-case scenario can be achieved using beamforming circuit 400 if $\varphi$ is less than 15°. Furthermore, for $\varphi$ larger than 15°, a worst-case gain of 0.2 dB can be achieved.

While the gains with large values of $\varphi$ are small with a single antenna array 510, even considering large values of $\varphi$, significant gain can be achieved when multiple antenna arrays 510 are used. In example 500, four antenna arrays 510 are arranged to form an 8×4 array of antennas. Each antenna array 510 is an 8×1 array of antennas. With a wide coverage area (e.g., $\varphi$ larger than 15°), as described above, an individual antenna array 510 may experience a gain of only approximately 0.2 dB. However, significantly greater gain can be achieved when multiple antenna arrays 510 are used. For example, for an 8×4 array, gain of over 5 dB can be achieved by performing co-phasing. Such greater gains can also be achieved for other arrangements of antenna arrays 510, such as to form a 16×1 array or the like. Thus, tiling of antenna arrays 510 (e.g., arrangement of antenna arrays 510 to form a larger array of antennas) can lead to co-phasing gains if the configurable phase shifters of the beamforming circuits 400 associated with the antenna arrays 510 are configured properly.

As indicated above, FIG. 5 is provided as an example. Other examples may differ from what is described with regard to FIG. 5.

Figure 6:
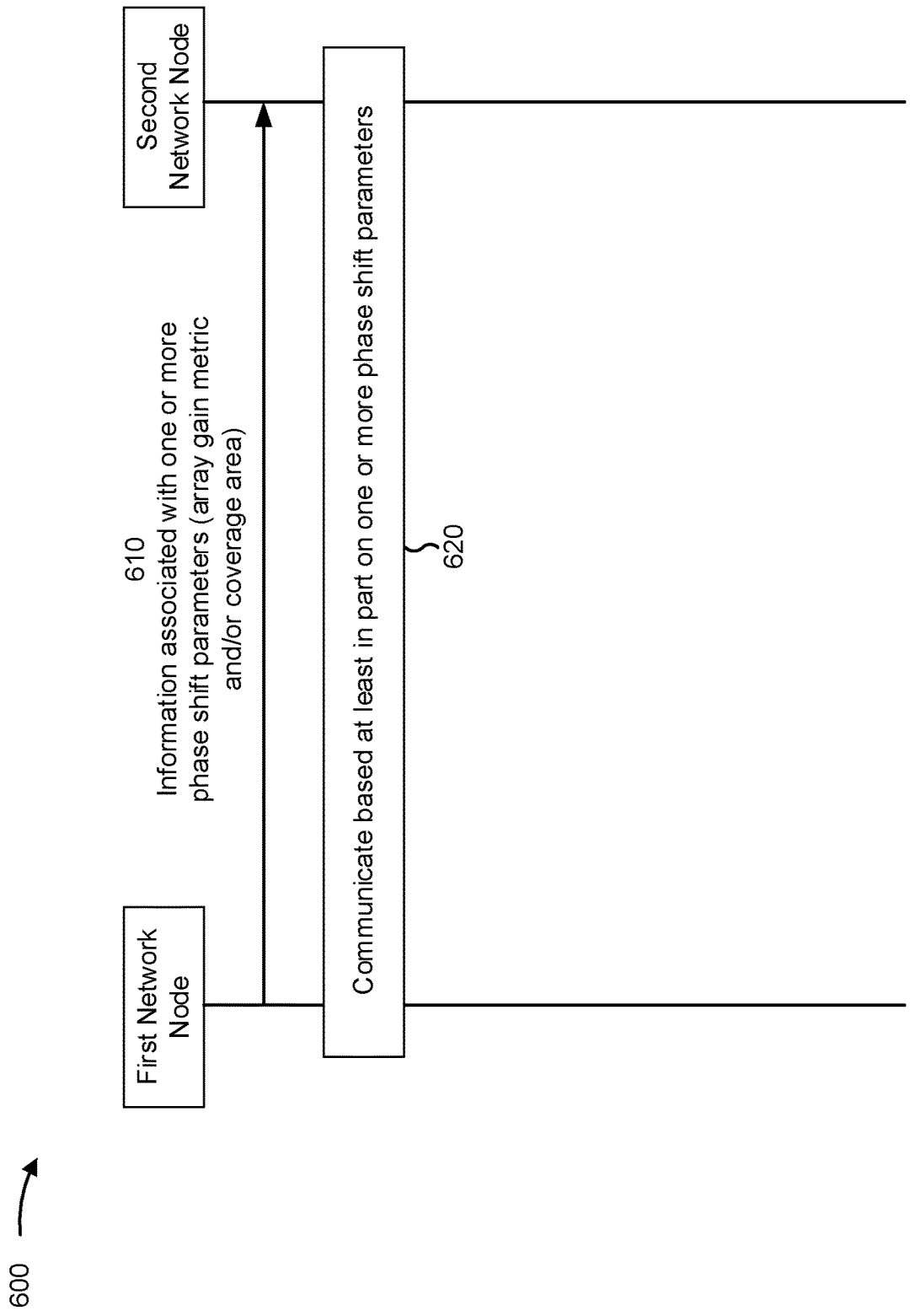
FIG. 6 is a diagram illustrating an example of signaling associated with indication of a configuration for a beamforming circuit, in accordance with the present disclosure.

FIG. 6 is a diagram illustrating an example 600 of signaling associated with indication of a configuration for a beamforming circuit, in accordance with the present disclosure. Example 600 includes a first network node (e.g., UE 104, base station 102, any wireless communication device) and a second network node (e.g., UE 104, base station 102, any wireless communication device).

Example 600 shows how the first network node can provide information indicating a coverage area of the first network node and a gap in an array gain metric to the second network node (and/or other network nodes). For example, depending on a configuration of antenna arrays of the first network node (e.g., array size, number of antenna arrays, arrangement of antennas within an antenna array, and so on) and a desired coverage area [−φ, φ], there is an optimal phase shifter configuration of beamforming circuits 400 of the first network node. However, the optimal configuration is not always practical, so in some scenarios, a sub-optimal phase shifter configuration may be used, which can impact output power (e.g., effective isotropic radiated power (EIRP)), thereby impacting link margin and power control. A phase shifter configuration may indicate a set of phase shift parameters for a set of configurable phase shifters 415 and/or 425 of one or more beamforming circuits 400. A phase shift parameter may identify a setting for a configurable phase shifter 415, such as a phase shift to be applied or an index corresponding to a phase shift to be applied. The difference in gain between a used phase shifter configuration (e.g., a configuration in use at one or more sets of configurable phase shifters) at the first network node and an optimal phase shifter configuration at the first network node (e.g., an optimized configuration for the one or more sets of configurable phase shifters) may be referred to herein as an array gain metric. The array gain metric for the first network node is associated with the coverage area of the first network node, since the optimal phase shifter configuration depends at least on the coverage area of the first network node.

As shown in FIG. 6, and by reference number 610, the first network node may transmit, and the second network node may receive, information associated with one or more phase shift parameters for a beamforming circuit 400. In some aspects, the first network node may broadcast such information. In some aspects, the first network node may transmit such information to the second network node (e.g., via unicast, multicast, downlink control information, uplink control information, backhaul signaling, or the like) As described above, the beamforming circuit 400 may include a Butler matrix having one or more sets of configurable phase shifters 415 and/or 425. In example 600, the information associated with the one or more phase shifter parameters may indicate at least one of a coverage area of the first network node (such as in terms of [−φ, φ] or in different terms) or an array gain metric associated with the first network node. As described above, the array gain metric indicates a difference between a first array gain associated with an optimized configuration for the one or more sets of configurable phase shifters and a second array gain for a configuration in use at the one or more sets of configurable phase shifters. For example, the array gain metric may be based at least in part on a size of an antenna array or tile associated with the beamforming circuit (e.g., a number of antennas of the antenna array or tile, an arrangement of antennas of the antenna array or tile, or a spatial relationship between antennas of the antenna array or tile), a number of antenna arrays or tiles used at the network node, or the one or more sets of configurable phase shifters (e.g., phase shift parameters of the one or more sets of configurable phase shifters). In some aspects, the array gain metric may be based at least in part on a lookup table, which may indicate array gain metrics corresponding to particular combinations of array size, number of tiles, size of a combined antenna array (composed of multiple constituent antenna arrays 510), or the like.

In some aspects, the array gain metric may be based at least in part on an observed array gain. For example, the first network node may determine an array gain associated with a configuration in use at the first network node, and may determine the array gain metric using the determined array gain. In some aspects, the array gain metric may be based at least in part on a worst case array gain for the coverage area. A worst case array gain for a coverage area may be associated with a least optimal configuration of the configurable phase shifters of the first network node, or a lowest observed array gain associated with the coverage area. In some aspects, the array gain metric may be based at least in part on a mean array gain for the coverage area. A mean array gain may be associated with an "average" configuration of the configurable phase shifters (such as based at least in part on a difference between an optimal configuration and a least optimal configuration) or may be based at least in part on an average of observed array gains associated with a coverage area.

As shown by reference number 620, the first network node and the second network node may communicate based at least in part on the one or more phase shift parameters. For example, the first network node may transmit or receive communications using one or more beams generated by one or more beamforming circuits 400 in accordance with the one or more phase shift parameters. In some aspects, the second network node may perform power control or rate control based at least in part on the one or more phase shift parameters and/or the information associated with the one or more phase shift parameters. For example, in some aspects, the second network node may determine a power control value for a transmission or reception based at least in part on the array gain metric and/or the coverage area. As another example, in some aspects, the second network node may determine a rate control value based at least in part on the array gain metric and/or the coverage area. In this way, network nodes can communicate with one another regarding phase shift parameters in use at one or more of the network nodes, which can provide information useful for link margin determination, power control loop operation, and so on. Thus, reliability of communications may be improved, power utilization may be improved, and the occurrence of link failure may be reduced.

As indicated above, FIG. 6 is provided as an example. Other examples may differ from what is described with regard to FIG. 6.

Figure 7:
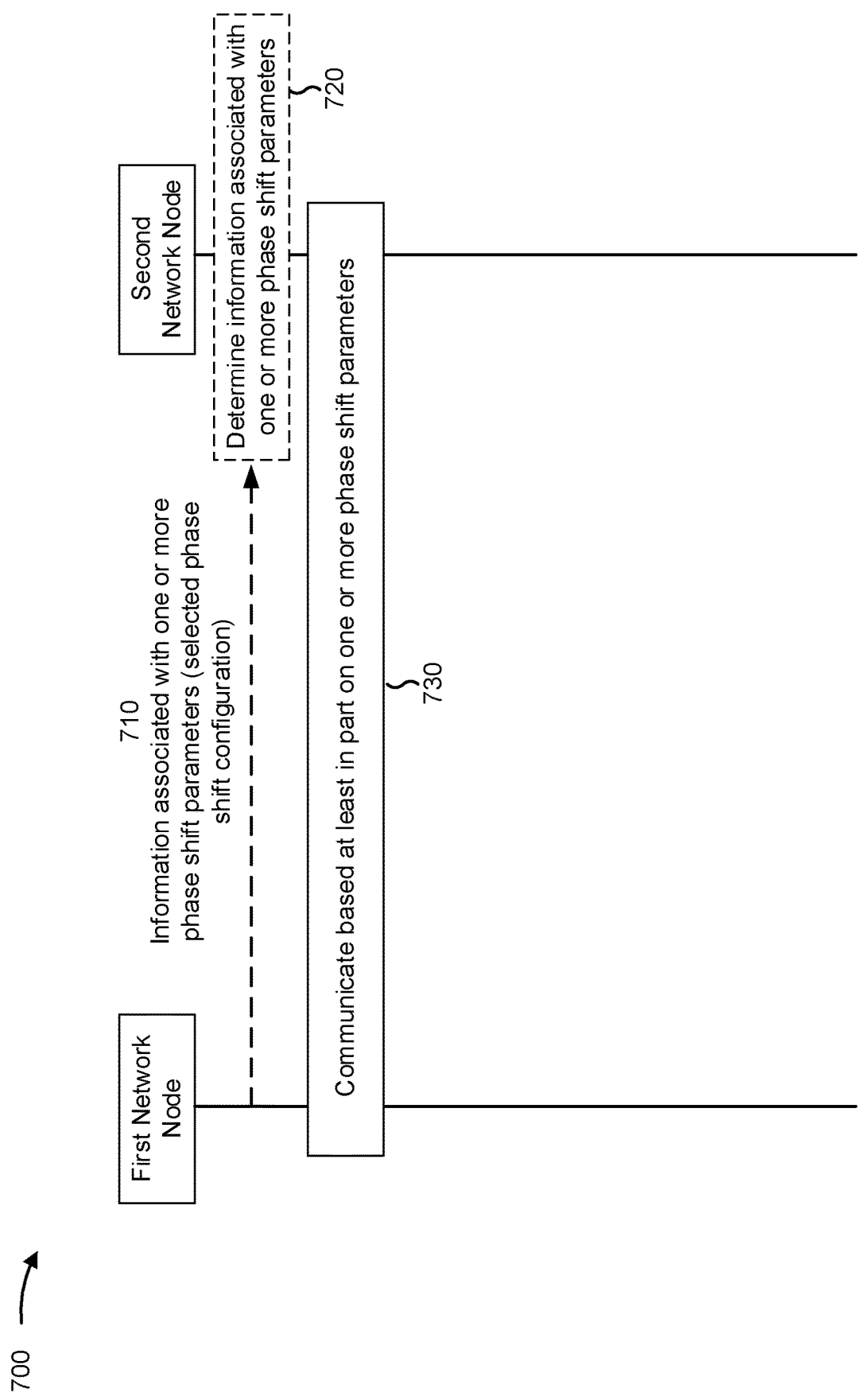
FIG. 7 is a diagram illustrating another example of signaling associated with indication of a configuration for a beamforming circuit.

FIG. 7 is a diagram illustrating another example 700 of signaling associated with indication of a configuration for a beamforming circuit. Example 700 includes a first network node (e.g., UE 104, base station 102, any wireless communication device) and a second network node (e.g., UE 104, base station 102, any wireless communication device). In example 700, the first network node provides, to the second network node, a selected phase shift configuration for a beamforming circuit 400 of the second network node. Example 700 may be particularly useful, for example, for indication of a selected phase shift configuration for a beamforming circuit 400 of a UE.

As shown in FIG. 7, and by reference number 710, in some aspects, the first network node may transmit, and the second network node may receive, information associated with one or more phase shift parameters for a beamforming circuit 400. In example 700, the information associated with the one or more phase shift parameters may indicate a selected phase shift configuration for one or more sets of configurable phase shifters of a beamforming circuit 400 (or multiple beamforming circuits 400). For example, for a configurable phase shifter (e.g., configurable phase shifter 415 and/or 425) supporting L-bit phase shifting, the selected phase shift configuration may indicate a selected phase shift from $2^L$ supported phase shifts of the configurable phase shifter. In such examples, the selected phase shift configuration may indicate a respective phase shift for each of a plurality of configurable phase shifters (e.g., one phase shift per configurable phase shifter, a phase shift setting that applies to multiple configurable phase shifters, a configuration that indicates each phase shift of multiple configurable phase shifters, or the like).

In some aspects, the $2^L$ supported phase shifts may not be a uniform quantization. For example, different phase shift configurations may be defined such that different coverage areas can be achieved at the second network node. This may enable a phase shift configuration that provides an appropriate coverage area in view of clusters experienced by the second network node or in view of a use case associated with the second network node. For example, if there is a narrow angular spread of clusters at the second network node, the selected phase shift configuration can be selected to provide a narrow coverage area (e.g., a first coverage area), which may be associated with increased array gain relative to a phase shift configuration that provides a wider coverage area (e.g., a second coverage area). As another example, a UE performing a positioning operation may benefit from a narrow angular spread, so the selected phase shift configuration can be selected to provide a narrow coverage area to achieve the narrow angular spread.

In some aspects, the selected phase shift configuration may be based at least in part on an estimate of a channel profile associated with the second network node. For example, the first network node (or a server) may determine the selected phase shift configuration based at least in part on the estimate of the channel profile. In some aspects, the first network node or the server may use a model, such as a model trained using a machine learning algorithm, to select the phase shift configuration.

As shown by reference number 720, in some aspects, the second network node may determine the selected phase shift configuration. For example, the second network node may select the selected phase shift configuration, and may transmit, to the first network node, information indicating the selected phase shift configuration. In some aspects, the second network node may select the selected phase shift configuration in order to change a scan angle at the second network node. Additionally, or alternatively, the second network node may transmit, to the first network node, a request to change the scan angle at the second network node. In such examples, the selected phase shift configuration may provide a changed scan angle where expected performance is guaranteed at the second network node. Changing the scan angle by modifying the phase shift configuration may use less power and introduce less latency than using an oversampled discrete Fourier transform (DFT) beam set to change the scan angle.

As shown by reference number 730, the first network node and the second network node may communicate based at least in part on the one or more phase shift parameters. For example, the second network node may transmit or receive communications using one or more beams generated by one or more beamforming circuits 400 in accordance with the one or more phase shift parameters.

As indicated above, FIG. 7 is provided as an example. Other examples may differ from what is described with regard to FIG. 7.

The techniques described above with regard to FIGS. 5-7 may be useful in a variety of use cases. As a first example, consider a base station that is to broadcast information on 8 beams using a size-8 Butler matrix beamforming circuit 400 (that is, including 8 second input/output ports corresponding to 8 antennas) to a set of UEs. The base station (or a server associated with the base station) may determine location information associated with the set of UEs, beam information associated with the base station (e.g., a set of phase shift parameters implementable by the base station, a set of phase shift configurations implementable at the base station, or the like). The base station or the server may determine a desired coverage area such that performance (e.g., array gain, power usage, etc.) is optimized, and may implement a phase shift configuration that provides the desired coverage area.

As a second example, consider a UE performing cellular vehicle to anything (C-V2X) communication. The UE (or a vehicle associated with the UE) can detect the location of other vehicles/UEs, such as based at least in part on a basic safety message. The UE may determine a set of phase shift parameters based at least in part on the locations of the other vehicles/UEs. The set of phase shift parameters may be selected such that the UE can transmit or receive information to each of the other vehicles/UEs (e.g., such that each of the other vehicles/UEs is within a coverage area of the UE when using the set of phase shift parameters).

As a third example, a UE may have a particular angular spread for the clusters that determine propagation in the channel. The UE, or a base station to which the UE is connected, may configure a set of phase shift parameters such that a coverage area of the UE accommodates the particular angular spread associated with the clusters and such that performance is optimized.

Figure 8:
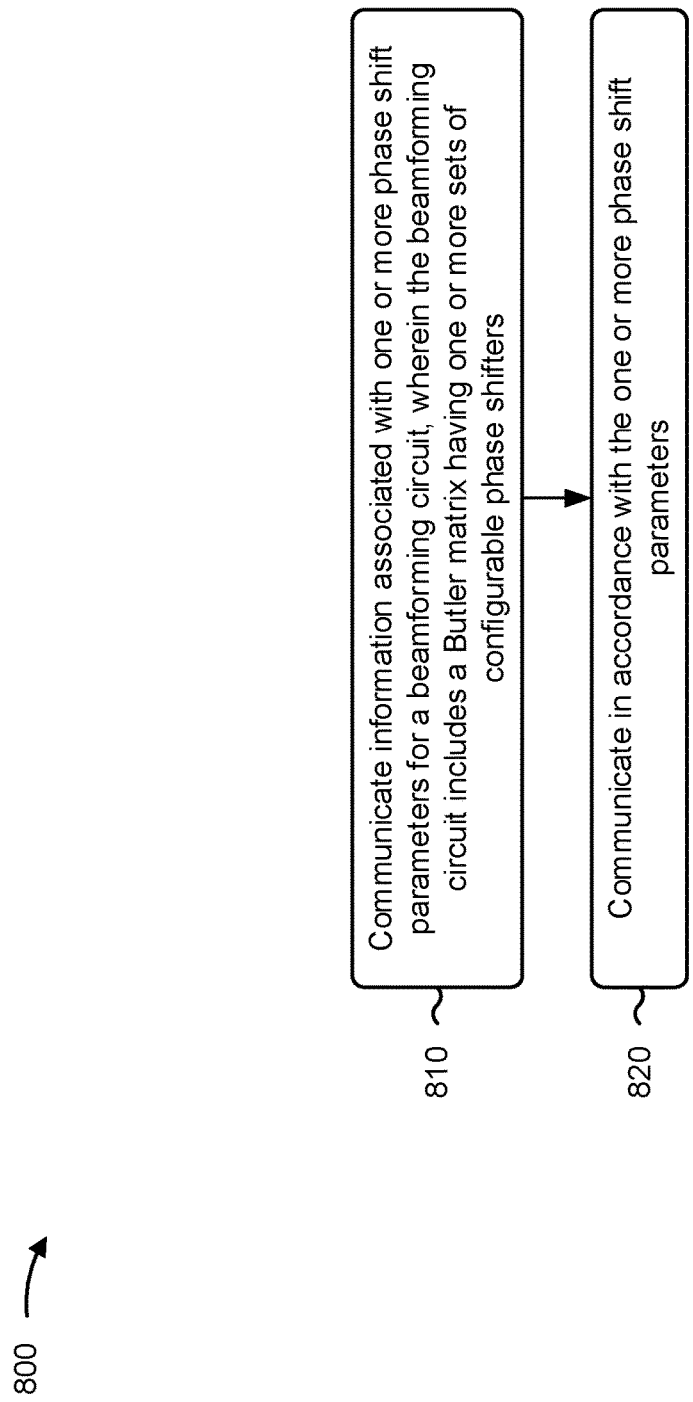
FIG. 8 is a diagram illustrating an example process performed, for example, by a network node.

FIG. 8 is a diagram illustrating an example process 800 performed, for example, by a network node. Example process 800 is an example where the network node (e.g., BS 102, UE 104) performs operations associated with configurable phase shifters for a Butler matrix architecture.

As shown in FIG. 8, in some aspects, process 800 may include communicating information associated with one or more phase shift parameters for a beamforming circuit, wherein the beamforming circuit includes a Butler matrix having one or more sets of configurable phase shifters (block 810). For example, the network node (e.g., using communication manager 198, beamforming circuit 400, and/or transceiver 908) may communicate information associated with one or more phase shift parameters for a beamforming circuit, wherein the beamforming circuit includes a Butler matrix having one or more sets of configurable phase shifters, as described above.

As further shown in FIG. 8, in some aspects, process 800 may include communicating in accordance with the one or more phase shift parameters (block 820). For example, the network node (e.g., using communication manager 198, beamforming circuit 400, and/or transceiver 908) may communicate in accordance with the one or more phase shift parameters, as described above.

Process 800 may include additional aspects, such as any single aspect or any combination of aspects described below and/or in connection with one or more other processes described elsewhere herein, such as in connection with FIGS. 4, 5, 6, and 7.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Example Wireless Communication Devices

Figure 9:
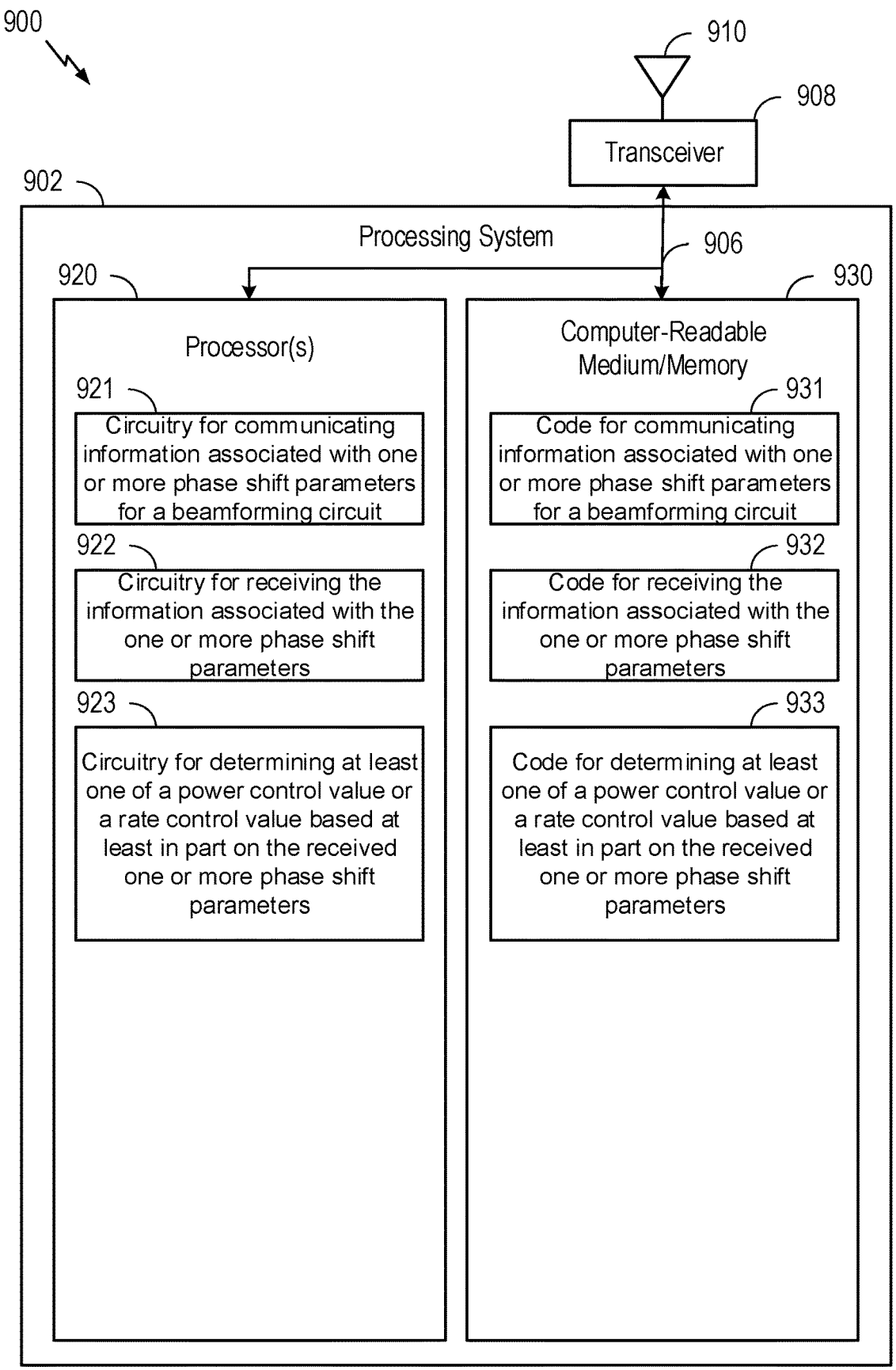
FIG. 9 depicts aspects of an example communications device.

FIG. 9 depicts an example communications device 900 (e.g., a network node) that includes various components operable, configured, or adapted to perform operations for the techniques disclosed herein, such as the operations depicted and described with respect to 4-7. In some examples, communication device 900 may be a base station 102 as described, for example with respect to FIGS. 1 and 2. In some examples, communication device 900 may be a user equipment 104 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910 (e.g., antenna 234, antenna 252), such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIGS. 4-7, or other operations for performing the various techniques discussed herein for communicating phase shifter parameters.

In the depicted example, computer-readable medium/memory 930 stores code 931 for communicating information associated with one or more phase shift parameters for a beamforming circuit, code 932 for receiving the information associated with the one or more phase shift parameters, and code 933 for determining at least one of a power control value or a rate control value based at least in part on the received one or more phase shift parameters.

In the depicted example, the one or more processors 920 include circuitry configured to implement the code stored in the computer-readable medium/memory 930, including circuitry 921 for communicating information associated with one or more phase shift parameters for a beamforming circuit, circuitry 922 for receiving the information associated with the one or more phase shift parameters, and circuitry 923 for determining at least one of a power control value or a rate control value based at least in part on the received one or more phase shift parameters.

Various components of communications device 900 may provide means for performing the methods described herein, including with respect to FIGS. 4-7.

In some examples, means for transmitting or sending (or means for outputting for transmission) may include the transceivers 232 and/or antenna(s) 234 of the base station 102 illustrated in FIG. 2 and/or transceiver 908 and antenna 910 of the communication device 900 in FIG. 9. In some examples, means for transmitting or sending (or means for outputting for transmission) may include the transceivers 254 and/or antenna(s) 252 of the user equipment 104 illustrated in FIG. 2 and/or transceiver 908 and antenna 910 of the communication device 900 in FIG. 9.

In some examples, means for receiving (or means for obtaining) may include the transceivers 232 and/or antenna(s) 234 of the base station illustrated in FIG. 2 and/or transceiver 908 and antenna 910 of the communication device 900 in FIG. 9. In some examples, means for receiving (or means for obtaining) may include the transceivers 254 and/or antenna(s) 252 of the user equipment 104 illustrated in FIG. 2 and/or transceiver 908 and antenna 910 of the communication device 900 in FIG. 9.

In some examples, means for communicating information associated with one or more phase shift parameters for a beamforming circuit, means for receiving the information associated with the one or more phase shift parameters, and means for determining at least one of a power control value or a rate control value based at least in part on the received one or more phase shift parameters may include various processing system components, such as: the one or more processors 920 in FIG. 9, or aspects of the base station 102 depicted in FIG. 2, including receive processor 238, transmit processor 220, TX MIMO processor 230, and/or controller/processor 240 (including communication manager 198), or aspects of the user equipment 104 depicted in FIG. 2, including receive processor 258, transmit processor 264, TX MIMO processor 266, and/or controller/processor 280 (including communication manager 198).

Notably, FIG. 9 is an example, and many other examples and configurations of communication device 900 are possible.

Example Clauses

Implementation examples are described in the following numbered clauses:

Clause 1: A method of wireless communication performed by a network node, comprising: communicating information associated with one or more phase shift parameters for a beamforming circuit, wherein the beamforming circuit includes a Butler matrix having one or more sets of configurable phase shifters; and communicating in accordance with the one or more phase shift parameters.

Clause 2: The method of Clause 1, wherein the information associated with the one or more phase shift parameters includes information indicating a coverage area of the network node.

Clause 3: The method of Clause 1, wherein the information associated with the one or more phase shift parameters includes information indicating an array gain metric associated with a coverage area of the network node.

Clause 4: The method of Clause 3, wherein the array gain metric indicates a difference between a first array gain associated with an optimized configuration for the one or more sets of configurable phase shifters and a second array gain for a configuration in use at the one or more sets of configurable phase shifters.

Clause 5: The method of Clause 4, wherein the array gain metric is based at least in part on at least one of: a size of an antenna array or tile associated with the beamforming circuit, a number of antenna arrays or tiles used at the network node, or the one or more sets of configurable phase shifters.

Clause 6: The method of Clause 3, wherein the array gain metric is based at least in part on at least one of: a worst case array gain for the coverage area, or a mean array gain for the coverage area.

Clause 7: The method of any of Clauses 1-6, wherein the method further comprises: receiving the information associated with the one or more phase shift parameters; determining at least one of a power control value or a rate control value based at least in part on the received information associated with the one or more phase shift parameters, wherein the communicating in accordance with the one or more phase shift parameters comprises communicating based at least in part on the power control value or the rate control value.

Clause 8: The method of Clause 7, wherein the communicating in accordance with the one or more phase shift parameters is performed prior to receiving the information associated with the one or more phase shift parameters.

Clause 9: The method of Clause 7, wherein the communicating in accordance with the one or more phase shift parameters is performed after receiving the information associated with the one or more phase shift parameters.

Clause 10: The method of any of Clauses 1-9, wherein the information associated with the one or more phase shift parameters indicates a selected phase shift configuration for the one or more sets of configurable phase shifters.

Clause 11: The method of Clause 10, wherein the selected phase shift configuration is selected from a plurality of phase shift configurations based at least in part on a use case.

Clause 12: The method of Clause 11, wherein a first phase shift configuration of the plurality of phase shift configurations is associated with a first beamwidth and a second phase shift configuration of the plurality of phase shift configurations is associated with a second beamwidth different than the first beamwidth.

Clause 13: The method of Clause 10, wherein the selected phase shift configuration is selected by a user equipment and transmitted to the network node by the user equipment.

Clause 14: The method of Clause 10, wherein the selected phase shift configuration is selected by the network node and transmitted to a user equipment.

Clause 15: The method of Clause 14, wherein the selected phase shift configuration is based at least in part on an estimate of a channel profile associated with the network node.

Clause 16: The method of Clause 10, wherein the selected phase shift configuration is associated with a scan angle where expected performance is guaranteed at a user equipment.

Clause 17: The method of Clause 16, wherein the selected phase shift configuration is based at least in part on a request, received from the user equipment, to modify the scan angle.

Clause 18: An apparatus, comprising: a memory comprising executable instructions; one or more processors configured to execute the executable instructions and cause the apparatus to perform a method in accordance with any one of Clauses 1-17.

Clause 19: An apparatus, comprising means for performing a method in accordance with any one of Clauses 1-17.

Clause 20: A non-transitory computer-readable medium comprising executable instructions that, when executed by one or more processors of an apparatus, cause the apparatus to perform a method in accordance with any one of Clauses 1-17.

Clause 21: A computer program product embodied on a computer-readable storage medium comprising code for performing a method in accordance with any one of Clauses 1-17.

Additional Wireless Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL).

The component carriers may include a primary component carrier and one or more secondary component carriers. A primary component carrier may be referred to as a primary cell (PCell) and a secondary component carrier may be referred to as a secondary cell (SCell).

Wireless network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for orthogonal frequency division multiplexing (OFDM)) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

BS 102 may include a beamforming circuit 284. Beamforming circuit 284 is an example of beamforming circuit 400, described in more detail in connection with FIG. 4. UE 104 may include a beamforming circuit 286. Beamforming circuit 286 is an example of beamforming circuit 400, described in more detail in connection with FIG. 4. In some aspects, BS 102 and/or UE 104 may include an RFIC (not shown in FIG. 2).

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCSs may be defined with respect to the base SCS (e.g., 30 kHz, 60 kHz, 120 kHz, 240 kHz, and others).

As above, FIGS. 3A-3D depict various example aspects of data structures for a wireless network, such as wireless network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK)/negative ACK (NACK) feedback. The PUSCH carries data, and may additionally be used to carry a buffer status report (BSR), a power headroom report (PHR), and/or UCI.

Additional Considerations

The preceding description provides examples of a modified Butler matrix architecture in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication performed by a network node, comprising:
communicating information associated with one or more phase shift parameters for a beamforming circuit, wherein the beamforming circuit includes a Butler matrix having one or more sets of configurable phase shifters,
wherein the information associated with the one or more phase shift parameters includes information indicating an array gain metric associated with a coverage area of the network node,
wherein the array gain metric indicates a difference between a first array gain associated with an optimized configuration for the one or more sets of configurable phase shifters and a second array gain for a configuration in use at the one or more sets of configurable phase shifters; and
communicating in accordance with the one or more phase shift parameters.

2. The method of claim 1, wherein the information associated with the one or more phase shift parameters includes information indicating the a-coverage area of the network node.

3. The method of claim 1, wherein the array gain metric is based at least in part on at least one of:
   a size of an antenna array or tile associated with the beamforming circuit,
   a number of antenna arrays or tiles used at the network node, or
   the one or more sets of configurable phase shifters.

4. The method of claim 1, wherein the array gain metric is based at least in part on at least one of:
   a worst case array gain for the coverage area, or
   a mean array gain for the coverage area.

5. The method of claim 1, wherein the method further comprises:
   receiving the information associated with the one or more phase shift parameters; and
   determining at least one of a power control value or a rate control value based at least in part on the received information associated with the one or more phase shift parameters,
   wherein the communicating in accordance with the one or more phase shift parameters comprises communicating based at least in part on the power control value or the rate control value.

6. The method of claim 5, wherein the communicating in accordance with the one or more phase shift parameters is performed prior to receiving the information associated with the one or more phase shift parameters.

7. The method of claim 5, wherein the communicating in accordance with the one or more phase shift parameters is performed after receiving the information associated with the one or more phase shift parameters.

8. The method of claim 1, wherein the information associated with the one or more phase shift parameters indicates a selected phase shift configuration for the one or more sets of configurable phase shifters.

9. The method of claim 8, wherein the selected phase shift configuration is selected from a plurality of phase shift configurations based at least in part on a use case.

10. The method of claim 9, wherein a first phase shift configuration of the plurality of phase shift configurations is associated with a first coverage area and a second phase shift configuration of the plurality of phase shift configurations is associated with a second coverage area different than the first coverage area.

11. The method of claim 8, wherein the selected phase shift configuration is selected by a user equipment and transmitted to the network node by the user equipment.

12. The method of claim 8, wherein the selected phase shift configuration is selected by the network node and transmitted to a user equipment.

13. The method of claim 12, wherein the selected phase shift configuration is based at least in part on an estimate of a channel profile associated with the network node.

14. The method of claim 8, wherein the selected phase shift configuration is associated with a scan angle where expected performance is guaranteed at a user equipment.

15. The method of claim 14, wherein the selected phase shift configuration is based at least in part on a request, received from the user equipment, to modify the scan angle.

16. An apparatus for wireless communication, comprising:
   a beamforming circuit comprising a Butler matrix architecture, comprising:
      a first set of input or output (input/output) ports;
      one or more sets of hybrid couplers;
      one or more sets of configurable phase shifters, wherein a configurable phase shifter, of the one or more sets of configurable phase shifters, is configurable to apply a selected phase shift to a signal; and
      a second set of input/output ports,
   wherein the apparatus is configured to:
      communicate information associated with one or more phase shift parameters for the beamforming circuit,
      wherein the information associated with the one or more phase shift parameters includes information indicating an array gain metric associated with a coverage area of the network node,
      wherein the array gain metric indicates a difference between a first array gain associated with an optimized configuration for the one or more sets of configurable phase shifters and a second array gain for a configuration in use at the one or more sets of configurable phase shifters; and
      communicate in accordance with the one or more phase shift parameters.

17. The apparatus of claim 16, wherein the first set of input/output ports is connected to a radio frequency integrated circuit (RFIC) of the apparatus.

18. The apparatus of claim 16, wherein the second set of input/output ports is connected to a set of antennas of the apparatus.

19. An apparatus for wireless communication at a network node, comprising:
   a memory; and
   one or more processors, coupled to the memory, configured to cause the apparatus to:
      communicate information associated with one or more phase shift parameters for a beamforming circuit, wherein the beamforming circuit includes a Butler matrix having one or more sets of configurable phase shifters,
      wherein the information associated with the one or more phase shift parameters includes information indicating an array gain metric associated with a coverage area of the network node,
      wherein the array gain metric indicates a difference between a first array gain associated with an optimized configuration for the one or more sets of configurable phase shifters and a second array gain for a configuration in use at the one or more sets of configurable phase shifters; and
      communicate in accordance with the one or more phase shift parameters.

20. An apparatus for wireless communication, comprising:
   means for communicating information associated with one or more phase shift parameters for a beamforming circuit, wherein the beamforming circuit includes a Butler matrix having one or more sets of configurable phase shifters,
   wherein the information associated with the one or more phase shift parameters includes information indicating an array gain metric associated with a coverage area of the network node,
   wherein the array gain metric indicates a difference between a first array gain associated with an optimized configuration for the one or more sets of configurable phase shifters and a second array gain for a configuration in use at the one or more sets of configurable phase shifters; and means for communicating in accordance with the one or more phase shift parameters.

21. The apparatus of claim 19, wherein the information associated with the one or more phase shift parameters includes information indicating the coverage area of the network node.

22. The apparatus of claim 19, wherein the array gain metric is based at least in 32. part on at least one of:
    a size of an antenna array or tile associated with the beamforming circuit,
    a number of antenna arrays or tiles used at the network node, or
    the one or more sets of configurable phase shifters.

23. The apparatus of claim 19, wherein the array gain metric is based at least in part on at least one of:
    a worst case array gain for the coverage area, or
    a mean array gain for the coverage area.

24. The apparatus of claim 19, wherein the one or more processors are configured to cause the apparatus to:
    receive the information associated with the one or more phase shift parameters; and
    determine at least one of a power control value or a rate control value based at least in part on the received information associated with the one or more phase shift parameters,
    wherein to communicate in accordance with the one or more phase shift parameters, the one or more processors are configured to cause the apparatus to communicate based at least in part on the power control value or the rate control value.

25. The apparatus of claim 24, wherein the one or more processors are configured to cause the apparatus to communicate in accordance with the one or more phase shift parameters prior to reception of the information associated with the one or more phase shift parameters.

26. The apparatus of claim 24, wherein the one or more processors are configured to cause the apparatus to communicate in accordance with the one or more phase shift parameters after reception of the information associated with the one or more phase shift parameters.

27. The apparatus of claim 19, wherein the information associated with the one or more phase shift parameters indicates a selected phase shift configuration for the one or more sets of configurable phase shifters.

28. The apparatus of claim 27, wherein the selected phase shift configuration is selectable from a plurality of phase shift configurations based at least in part on a use case.

29. The apparatus of claim 28, wherein a first phase shift configuration of the plurality of phase shift configurations is associated with a first coverage area and a second phase shift configuration of the plurality of phase shift configurations is associated with a second coverage area different than the first coverage area.

30. The apparatus of claim 27, wherein the selected phase shift configuration is configured to be selected by a user equipment and transmitted to the network node by the user equipment.

31. The apparatus of claim 27, wherein the selected phase shift configuration is configured to be selected by the network node and transmitted to a user equipment.

32. The apparatus of claim 31, wherein the selected phase shift configuration is based at least in part on an estimate of a channel profile associated with the network node.

33. The apparatus of claim 27, wherein the selected phase shift configuration is associated with a scan angle where expected performance is guaranteed at a user equipment.

34. The apparatus of claim 33, wherein the selected phase shift configuration is based at least in part on a request to modify the scan angle.

* * * * *